United States Patent
Pei et al.

(10) Patent No.: US 12,380,030 B2
(45) Date of Patent: Aug. 5, 2025

(54) PERSISTENT STORAGE WITH DUAL INTERFACE

(71) Applicant: Samsung Electronics Co., Ltd., Suwon-si (KR)

(72) Inventors: Shuyi Pei, Santa Clara, CA (US); Jing Yang, Glen Allen, VA (US); Rekha Pitchumani, Oak Hill, VA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 47 days.

(21) Appl. No.: 18/163,208

(22) Filed: Feb. 1, 2023

(65) Prior Publication Data
US 2024/0134796 A1    Apr. 25, 2024

Related U.S. Application Data

(60) Provisional application No. 63/417,940, filed on Oct. 20, 2022.

(51) Int. Cl.
| | | |
|---|---|---|
| *G06F 12/00* | (2006.01) | |
| *G06F 12/0831* | (2016.01) | |
| *G06F 12/0888* | (2016.01) | |
| *G06F 12/0891* | (2016.01) | |

(52) U.S. Cl.
CPC ...... *G06F 12/0833* (2013.01); *G06F 12/0888* (2013.01); *G06F 12/0891* (2013.01)

(58) Field of Classification Search
CPC ............. G06F 12/0833; G06F 12/0888; G06F 12/0891; G06F 2212/281; G06F 2212/313; G06F 12/0866; G06F 3/061; G06F 12/0802; G06F 13/4221; G06F 2212/1016

USPC .......................................................... 711/118
See application file for complete search history.

(56) References Cited

U.S. PATENT DOCUMENTS

| | | | | |
|---|---|---|---|---|
| 9,253,276 | B2* | 2/2016 | Henning | H04L 67/568 |
| 9,317,470 | B1* | 4/2016 | Raley | H04L 67/568 |
| 10,057,368 | B1* | 8/2018 | Raley | G06F 15/167 |
| 11,281,581 | B2 | 3/2022 | Lee | |
| 11,314,460 | B2 | 4/2022 | Xiao et al. | |
| 11,775,368 | B2* | 10/2023 | Bert | G06F 3/0635 |
| | | | | 714/42 |
| 2005/0114289 | A1 | 5/2005 | Fair | |
| 2019/0155760 | A1 | 5/2019 | Chang | |
| 2021/0109659 | A1 | 4/2021 | Bavishi | |
| 2021/0200683 | A1 | 7/2021 | Bavishi et al. | |
| 2022/0012192 | A1 | 1/2022 | Ryu | |

(Continued)

OTHER PUBLICATIONS

EPO Extended European Search Report dated Mar. 14, 2024, issued in corresponding European Patent Application No. 23202706.0 (7 pages).

*Primary Examiner* — Mardochee Chery
(74) *Attorney, Agent, or Firm* — Lewis Roca Rothgerber Christie LLP

(57) ABSTRACT

Systems and methods for persistent storage with a dual interface. In some embodiments, a persistent storage device includes: a processing circuit; a cache; and persistent storage. The processing circuit may be configured to perform a method, the method including: receiving a first write request according to a first protocol; saving a data payload of the first write request in a first portion of the cache; receiving a second write request according to a second protocol; and saving a data payload of the second write request in a second portion of the cache.

20 Claims, 15 Drawing Sheets

(56) References Cited

U.S. PATENT DOCUMENTS

2022/0147470 A1 5/2022 Lee et al.
2022/0179798 A1 6/2022 Bavishi

* cited by examiner

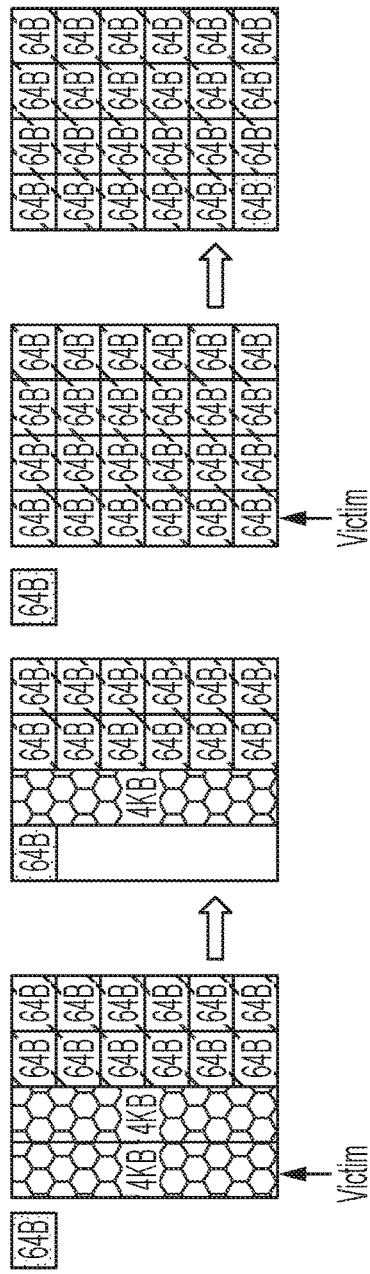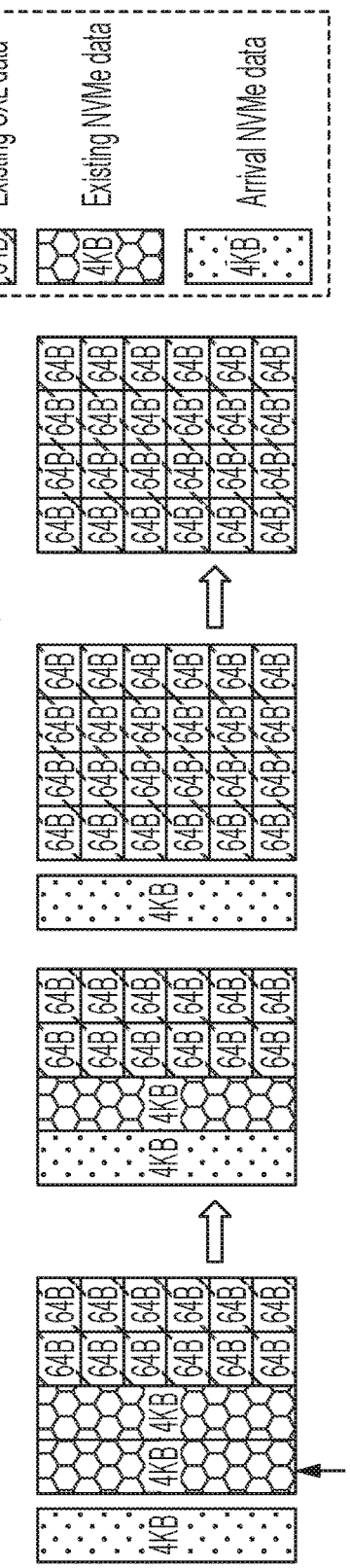
FIG. 2A  FIG. 2B  FIG. 2C  FIG. 2D  FIG. 2E  FIG. 2F

PERSISTENT STORAGE WITH DUAL INTERFACE

CROSS-REFERENCE TO RELATED APPLICATION(S)

The present application claims priority to and the benefit of U.S. Provisional Application No. 63/417,940, filed Oct. 20, 2022, entitled "CACHE LINE ACCESS PRIORITIZED CACHE DESIGN LEVERAGING SLC-TLC HYBRID NAND FLASH FOR SSDS THAT SUPPORT CACHE LINE AND PAGE I/O GRANULARITY ACCESSES", the entire content of which is incorporated herein by reference.

FIELD

One or more aspects of embodiments according to the present disclosure relate to data storage, and more particularly to a system and method for persistent storage with a dual interface.

BACKGROUND

Persistent storage devices may provide storage for a host computer. Such storage devices may communicate with the host computer using different interfaces, which may use data payloads of different sizes.

It is with respect to this general technical environment that aspects of the present disclosure are related.

SUMMARY

According to an embodiment of the present disclosure, there is provided a persistent storage device, including: a processing circuit; a cache; and persistent storage, the processing circuit being configured to perform a method, the method including: receiving a first write request according to a first protocol; saving a data payload of the first write request in a first portion of the cache; receiving a second write request according to a second protocol; and saving a data payload of the second write request in a second portion of the cache.

In some embodiments, the first write request includes a cache hint instructing the persistent storage device to employ caching.

In some embodiments: the first protocol addresses units of data at a first granularity; the second protocol addresses units of data at a second granularity different from the first granularity; and the method further includes: receiving a third write request, the third write request including a data payload and a cache hint, the cache hint instructing the persistent storage device to forego caching; and saving the data payload of the third write request in the persistent storage.

In some embodiments: the persistent storage includes first storage media and second storage media, the first storage media having higher read latency than the second storage media; the data payload of the third write request is smaller than a first threshold; and the saving of the data payload of the third write request in the persistent storage includes saving the data payload of the third write request in the second storage media.

In some embodiments: the first storage media includes a triple-level cell; and the second storage media includes a single-level cell.

In some embodiments, the method further includes: receiving a fourth write request, the fourth write request including a data payload and a cache hint, the cache hint instructing the persistent storage device to forego caching; and saving the data payload of the fourth write request in the persistent storage, wherein: the data payload of the fourth write request is larger than the first threshold; and the saving of the data payload of the fourth write request in the persistent storage includes saving the data payload of the fourth write request in the first storage media.

In some embodiments, the method further includes: receiving a fifth write request, the fifth write request including: a data payload larger than the first threshold; and a cache hint, the cache hint instructing the persistent storage device to employ caching; determining that the first portion of the cache is full; evicting data from the first portion of the cache; and saving the data payload of the fifth write request in the first portion of the cache.

In some embodiments, the method further includes: receiving a fifth write request, the fifth write request including: a data payload smaller than the first threshold; and a cache hint, the cache hint instructing the persistent storage device to employ caching; determining that the second portion of the cache is full and that space is available in the first portion of the cache; reducing the size of the first portion of the cache; increasing the size of the second portion of the cache; and saving the data payload of the fifth write request in the second portion of the cache.

In some embodiments, the method further includes: receiving a sixth write request, the sixth write request including: a data payload smaller than the first threshold; and a cache hint, the cache hint instructing the persistent storage device to employ caching; determining that the first portion of the cache is full and that the second portion of the cache is full; evicting data from the first portion of the cache; reducing the size of the first portion of the cache; increasing the size of the second portion of the cache; and saving the data payload of the sixth write request in the second portion of the cache.

In some embodiments, the method further includes: receiving a sixth write request, the sixth write request including: a data payload smaller than the first threshold; and a cache hint, the cache hint instructing the persistent storage device to employ caching; determining that the first portion of the cache has a size of zero and that the second portion of the cache is full; evicting data from the second portion of the cache; and saving the data payload of the sixth write request in the second portion of the cache.

In some embodiments, the first write request is a Nonvolatile Memory Express (NVMe) write request, and the second write request is a Compute Express Link (CXL) write request.

According to an embodiment of the present disclosure, there is provided a method, including: receiving, by a persistent storage device, a first write request according to a first protocol; saving a data payload of the first write request in a first portion of a cache; receiving a second write request according to a second protocol; and saving a data payload of the second write request in a second portion of the cache.

In some embodiments, the first write request includes a cache hint instructing the persistent storage device to employ caching.

In some embodiments: the first protocol addresses units of data at a first granularity; the second protocol addresses units of data at a second granularity different from the first granularity; and the method further includes: receiving a third write request, the third write request including a data payload and a cache hint, the cache hint instructing the persistent storage device to forego caching; and saving the data payload of the third write request in persistent storage of the persistent storage device.

In some embodiments: the persistent storage includes first storage media and second storage media, the first storage media having higher read latency than the second storage media; the data payload of the third write request is smaller than a first threshold; and the saving of the data payload of the third write request in the persistent storage includes saving the data payload of the third write request in the second storage media.

In some embodiments: the first storage media includes a triple-level cell; and the second storage media includes a single-level cell.

In some embodiments, the method further includes: receiving a fourth write request, the fourth write request including a data payload and a cache hint, the cache hint instructing the persistent storage device to forego caching; and saving the data payload of the fourth write request in the persistent storage, wherein: the data payload of the fourth write request is larger than the first threshold; and the saving of the data payload of the fourth write request in the persistent storage includes saving the data payload of the fourth write request in the first storage media.

In some embodiments, the method further includes: receiving a fifth write request, the fifth write request including: a data payload larger than the first threshold; and a cache hint, the cache hint instructing the persistent storage device to employ caching; determining that the first portion of the cache is full; evicting data from the first portion of the cache; and saving the data payload of the fifth write request in the first portion of the cache.

In some embodiments, the method further includes: receiving a fifth write request, the fifth write request including: a data payload smaller than the first threshold; and a cache hint, the cache hint instructing the persistent storage device to employ caching; determining that the second portion of the cache is full and that space is available in the first portion of the cache; reducing the size of the first portion of the cache; increasing the size of the second portion of the cache; and saving the data payload of the fifth write request in the second portion of the cache.

According to an embodiment of the present disclosure, there is provided a persistent storage device, including: means for processing; a cache; and persistent storage, the means for processing being configured to perform a method, the method including: receiving a first write request including a data payload larger than a first threshold; saving the data payload of the first write request in a first portion of the cache, the first portion being for data units having a size greater than the first threshold; receiving a second write request including a data payload smaller than the first threshold; and saving the data payload of the second write request in a second portion of the cache, the second portion being for data units having a size smaller than the first threshold.

BRIEF DESCRIPTION OF THE DRAWINGS

These and other features and advantages of the present disclosure will be appreciated and understood with reference to the specification, claims, and appended drawings wherein:

FIG. 2A is a cache data layout diagram, according to an embodiment of the present disclosure;

FIG. 2B is a data layout diagram, according to an embodiment of the present disclosure;

FIG. 2C is a data layout diagram, according to an embodiment of the present disclosure;

FIG. 2D is a data layout diagram, according to an embodiment of the present disclosure;

FIG. 2E is a legend for FIGS. 2A-2D;

FIG. 2F is a table of addresses, according to an embodiment of the present disclosure;

DETAILED DESCRIPTION

The detailed description set forth below in connection with the appended drawings is intended as a description of exemplary embodiments of a system and method for persistent storage with a dual interface provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In some embodiments, a persistent storage device provides two (or more) interfaces to a host computer, the host interfaces having different characteristics, and the persistent storage device is configured to provide data storage and retrieval functions tailored to the respective interfaces, to provide improved performance. For example, a persistent storage device may have a Nonvolatile Memory Express (NVMe) interface, for which the data payload size may be 4 kilobytes (kB) (or a multiple of 4 kB) and a Compute Express Link (CXL) interface, for which the data payload size may be a cache line, e.g., 64 bytes.

The persistent storage device may treat two different protocols that have different addressing granularities differently. For example, the persistent storage device may treat NVMe operations and CXL operations differently, e.g., to provide, at the CXL interface, the lower latency possible in part because of the smaller payload size. For example, the persistent storage device may include a cache partitioned into two regions, a region that is allocated to CXL data and a region that is allocated to NVMe data. Data accessed through the CXL interface may have priority for the use of the cache (e.g., data accessed through the NVMe interface may be evicted to make room for data accessed through the CXL interface). The persistent storage device may also have two kinds of persistent storage media (e.g., single-level cell storage media and triple-level cell storage media) with different performance characteristics, and the kind with, e.g., lower latency, may be reserved for storing data accessed through the CXL interface.

Figure 1A:
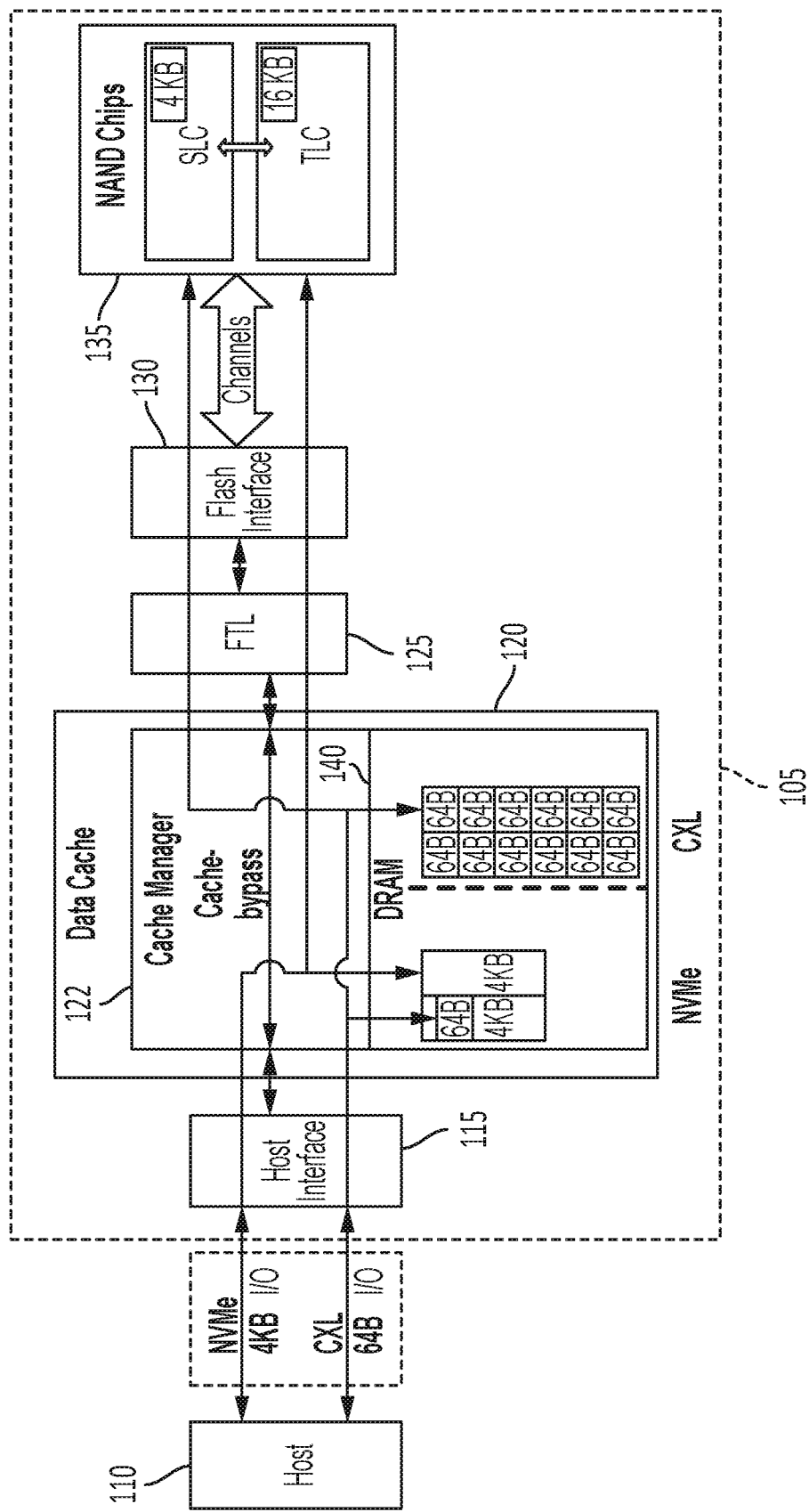
FIG. 1A is a block diagram of a portion of a computing system, according to an embodiment of the present disclosure.

Referring to FIG. 1A, in some embodiments, a persistent storage device 105 (e.g., a solid-state drive (SSD)) is connected to a host 110. The persistent storage device 105 includes a host interface 115, a data cache 120, a flash translation layer 125, a flash interface 130, and persistent storage media 135 (which may include a plurality of persistent storage chips, e.g., a plurality of single-level cell (SLC) NAND flash chips and a plurality of triple-level cell (TLC) NAND flash chips). The data cache 120 may include a cache manager 122 and a memory (e.g., a dynamic random access memory (DRAM)), which may be referred to as the cache 140.

The host interface 115 may support multiple protocols (e.g., Nonvolatile Memory Express (NVMe) and Compute Express Link (CXL)) through a single port or through multiple ports. As such, the persistent storage device 105 may be a block device with the capability to perform cache line addressable input-output requests. Each input-output (I/O) request (which may be a read request or a write request) may carry an (optional) cache hint which may take a value selected from the set {Cachable, Non-cachable}, instructing the persistent storage device to employ caching or to forego caching, respectively. NVMe requests with a size greater than 4 kB (e.g., requests to read or write blocks of data that have a size of n times 4 kB, with n being an integer greater than 1) may be divided into multiple 4 kB sub-requests for further processing.

When a CXL input-output request is received by the persistent storage device 105, the cache manager 122 may extract the logical page address (LPA) from the CXL input-output request and process the cache hint. The persistent storage device 105 may employ a CXL-prioritized cache design, for both read and write. The cache 140 may be partitioned into two regions, a first region for CXL data and second region for NVMe data. The partitioning may be dynamically adjusted (based on a replacement policy and evictions), so that, for example, the proportion of the total memory in the cache 140 that is allocated to CXL data may be increased and the proportion of the total memory in the cache 140 that is allocated to NVMe data may be decreased, or so that the proportion of the total memory in the cache 140 that is allocated to CXL data may be decreased and the proportion of the total memory in the cache 140 that is allocated to NVMe data may be increased. Any piece of data that has been accessed using a CXL read request or using a CXL write request may be classified as "CXL data", and any piece of data that has not been accessed using a CXL read request or using a CXL write request (and that has only been accessed with one or more NVMe read or write requests) may be classified as "NVMe data". Data in the region of the cache 140 that is allocated to CXL data may be stored in cache line (e.g., 64-byte) sized blocks, which may result in a higher hit ratio for CXL input-output requests (than if the data were stored in larger, e.g., 4 kilobyte (kB) blocks).

The single-level cell portion of the persistent storage media 135 (which may have lower read latency than the triple-level cell portion of the persistent storage media 135) may be used exclusively to store CXL data. Single-level cell flash memory may be faster (e.g., it may have lower read latency than the triple-level cell portion of the persistent storage media 135), it may use smaller (4 kB) physical pages, and it may have better endurance, and, as a result, it may be well suited for the intensive small input-output requests used for CXL. The triple-level cell portion of the persistent storage media 135 may be used exclusively to store NVMe data.

Figure 1B:
FIG. 1B is a bit allocation diagram, according to an embodiment of the present disclosure.

A CXL.MEM request may carry a host physical address (HPA) that has 46 bits or 47 bits, as shown in FIG. 1B. The logical page address (LPA) and the cache line offset (CLO) may be used to locate the 64-byte cache line, which can be extracted from the host physical address using bit-wise operations. The byte offset may be unused in the persistent storage device 105, e.g., if the smallest addressable data unit in the persistent storage device 105 is 64 bytes. As used herein, a host physical address is an address defined in the CXL specification, used by the host to refer to a physical address in memory of the host 110.

A one bit cache hint may be included in each input-output request received from the host 110. The cache hint may correspond to one of the options in the set {Cachable, Non-cachable}. When the hint is Cachable, and a cache miss occurs, the persistent storage device 105 may put the data in the cache 140. When the hint is Non-cachable, and a cache miss occurs, the persistent storage device 105 may not put the data in the cache 140. The default behavior may be that corresponding to the cache hint being Cachable. The host may send different cache hints with input-output requests for different protocols.

Figure 1C:
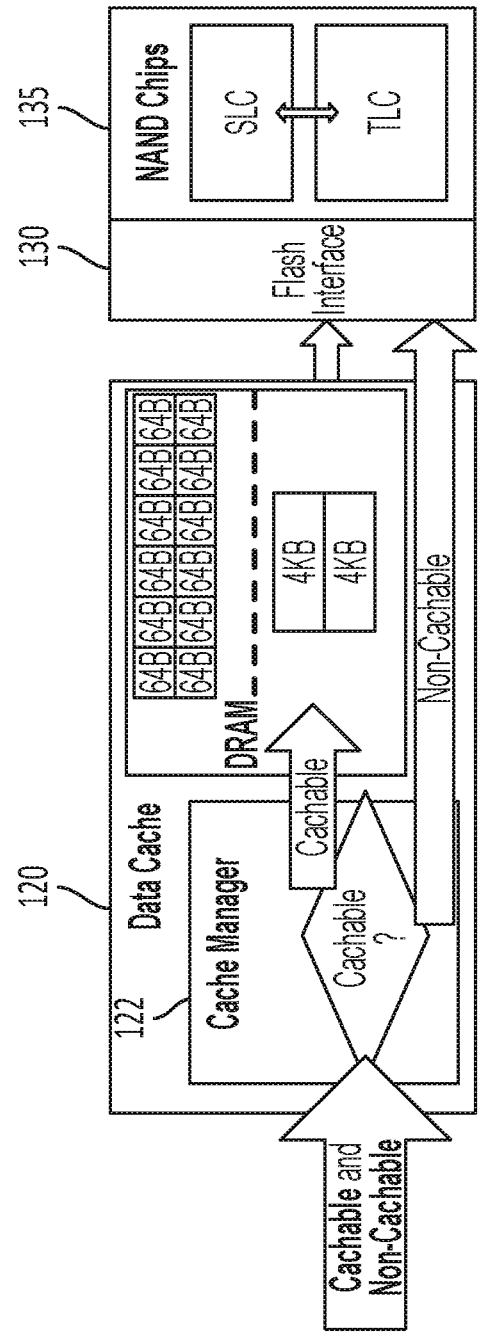
FIG. 1C is a hybrid block diagram and flowchart of a persistent storage device, according to an embodiment of the present disclosure.

FIG. 1C illustrates a cache-bypass mechanism for a write request, in some embodiments. As shown, when the cache hint is Cachable, the data accompanying the write request may be written to the cache 140; otherwise, it may be written to the persistent storage media 135. The cachable data may also be moved to the persistent storage media 135 upon cache eviction.

FIGS. 2A-2E illustrate a cache line access prioritized replacement policy, in some embodiments. FIGS. 2A and 2B illustrate a replacement policy that may be employed when a CXL write request is received and no space is left in the region of the cache 140 that is allocated to CXL data. As illustrated in FIG. 2A, when any region of the cache 140 is allocated to NVMe data (i.e., the size of this region is nonzero), then an existing cached 4 kB block of NVME data may be evicted, the 4 kB region that is freed as a result may be made part of the region of the cache 140 that is allocated to CXL data, and the CXL data received as part of the CXL write request may be written to this newly available 4 kB region. As illustrated in FIG. 2B, when no region of the cache 140 is allocated to NVMe data (i.e., the size of the region of the cache 140 that is allocated to NVMe data is zero), then an existing cached 64 byte (B) block of CXL data may be evicted, and the CXL data received as part of the CXL write request may be written to this newly free 64 byte region.

FIGS. 2C and 2D illustrate a replacement policy that may be employed when an NVMe write request is received and no space is left in the region of the cache 140 that is allocated to NVMe data. As illustrated in FIG. 2C, when any region of the cache 140 is allocated to NVMe data (i.e., the size of this region is nonzero), then an existing cached 4 kB block of NVME data may be evicted, and the NVMe data received as part of the NVMe write request may be written to this newly free 4 kB region. As illustrated in FIG. 2D, when no region of the cache 140 is allocated to NVMe data (i.e., the size of the region of the cache 140 that is allocated to NVMe data is zero), then the data in the cache 140 may be left in place (e.g., no 64 B block of data may be evicted), the NVMe data received as part of the NVMe write request may be written directly to the persistent storage media 135 (i.e., no caching of this data may be done). FIG. 2E is a legend for FIGS. 2A-2D.

In some embodiments, a replacement policy may be employed (as discussed below) that takes into account the architecture of the persistent storage media 135, which may, as mentioned above, include single-level cell media and triple-level cell. The replacement policy may specify the following. When evicting 4 kB data (from the region of the cache 140 that is allocated to NVMe data), if the LPA has only been accessed via NVMe, the 4 kB block of data may be stored in the triple-level cell media. When evicting 4 kB data (from the region of the cache 140 that is allocated to NVMe data), if the logical page address has also been accessed by CXL, the evicted data may be stored in the single-level cell media, and the 64-byte block that is CXL data (i.e., that was accessed via CXL) may be stored in the region of the cache 140 that is allocated to CXL data.

When evicting a 64-byte block of data (from the region of the cache 140 that is allocated to CXL data), the evicted data may be written to single-level cell media. This may be accomplished by (i) using a read-modify-write operation to read the 4 kB page that contains the 64-byte data block (e.g., from the single-level cell media) and to save it into the single-level cell media, or (ii) saving the operation in log structured form. In some embodiments, a buffer accumulates evicted 64B data blocks until a full 4 kB page is obtained. The latter approach (saving the operation in log structured form) (which may incur relatively high overhead) may involve writing to an open block in the single-level cell media directly, and updating the mapping table (which is illustrated in FIG. 2F). Subsequently, when any 4 kB block is read, the system may check the log structured data to determine whether any 64-byte block needs to be updated, based on a write operation recorded in log structured form. In FIG. 2F PPA_old is the old physical page address, CLO_old is the old cache line offset, PPA_new is the new physical page address, and CLO_new is the new cache line offset In some embodiments, cache lines (i.e., 64-byte blocks of data) are periodically evicted from the region of the cache 140 that is allocated to CXL data, and when this results in 4 kB of space in this region being free, the partition between the region of the cache 140 that is allocated to CXL data and the region of the cache 140 that is allocated to NVMe data may be moved so that an additional 4 kB block becomes available in the region of the cache 140 that is allocated to NVMe data. This may allow the cache 140 to be used for NVMe data, when CXL input-output requests are infrequent. The parameters controlling such evictions may be user configurable. For example, a lifetime may be set (e.g., specified by the user) and any 64-byte block may be evicted when it has not been accessed during a time interval exceeding the lifetime.

In some embodiments, data may be migrated from the single-level cell media to the triple-level cell media when garbage collection is performed in the single-level cell media. When data is migrated in this manner, it may be, by virtue of being stored in the triple-level cell media, considered to be NVMe data, and any record of their having been accessed via CXL may be erased. All data stored in the persistent storage media 135 may be accessed, at any time, via either CXL or NVME.

In some embodiments, cache coherence is not an issue, since each (64-byte or 4 kB) block is only saved in one place in the cache 140, either in the region of the cache 140 that is allocated to CXL data or in the region of the cache 140 that is allocated to NVMe data.

Figure 3A:
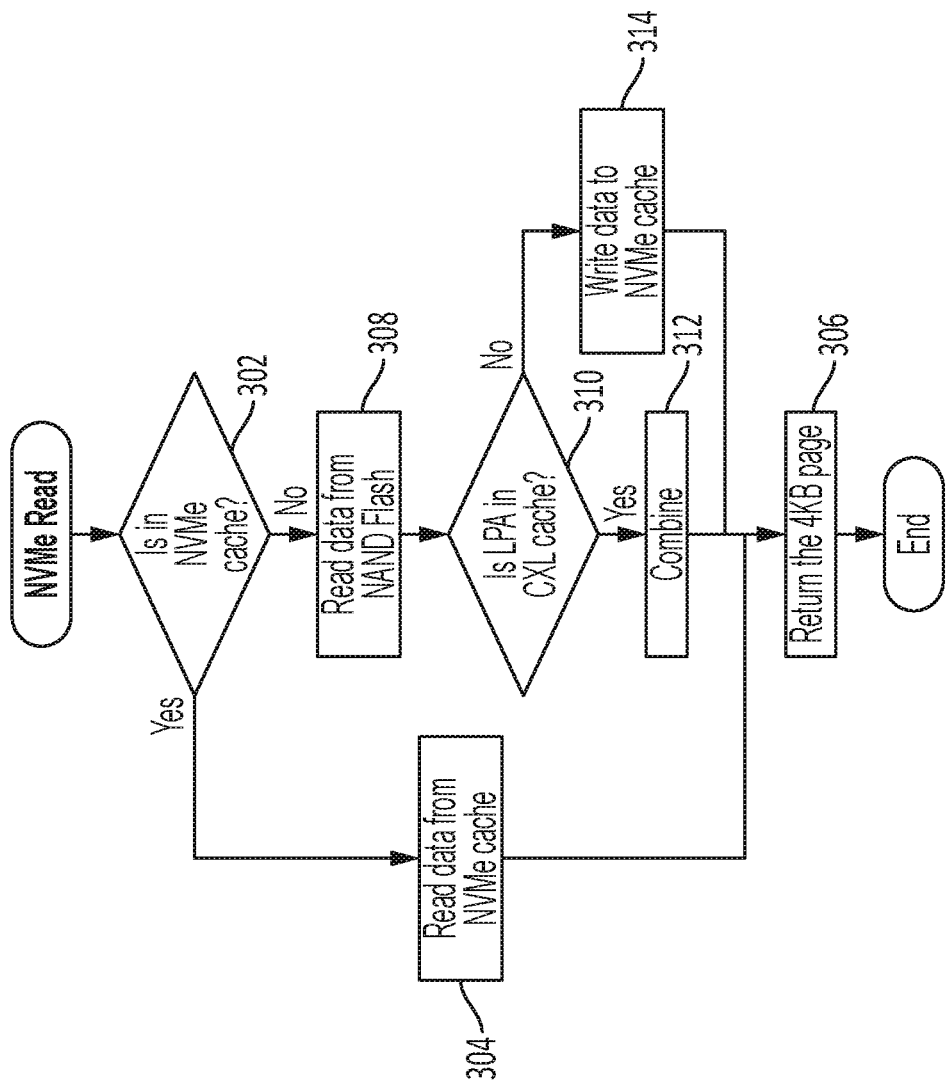
FIG. 3A is a flowchart of a first method for reading data, according to an embodiment of the present disclosure.
Figure 3B:
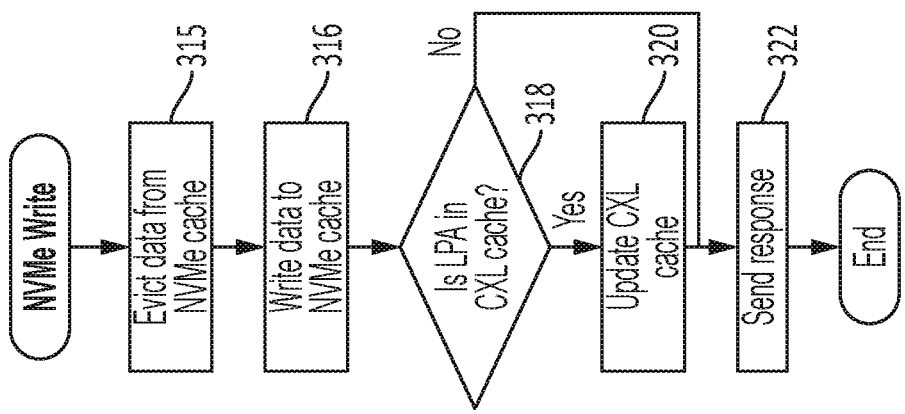
FIG. 3B is a flowchart of a first method for writing data, according to an embodiment of the present disclosure.

FIGS. 3A and 3B are flowcharts of an NVMe read-modify-write operation (with FIG. 3A being a flowchart of a read operation and FIG. 3B being a flowchart of a write operation), in an example in which the cache hint is Cachable, and the cache 140 is full and has both data for NVMe and for CXL. In FIG. 3A, the persistent storage device 105 determines, at 302, whether the data to be read is in the region of the cache 140 that is allocated to NVMe data. If it is, then the data is read, at 304, from the region of the cache 140 that is allocated to NVMe data, and at 306, the 4 kB page is returned. If it is not, then the data is read, at 308, from the persistent storage media 135, and at 310, the persistent storage device 105 determines (e.g., by searching a list of addresses associated with the region of the cache 140 that is allocated to CXL data) whether the logical page address being read is in the set of addresses associated with respective 64-byte blocks in the region of the cache 140 that is allocated to CXL data. If it is, then at 312, the data from the region of the cache 140 that is allocated to CXL data and the data from the region of the cache 140 that is allocated to NVMe data are combined or merged (e.g., any 64-byte blocks present in the region of the cache 140 that is allocated to CXL data are overwritten over the corresponding 64-byte blocks in the data read from the region of the cache 140 that is allocated to NVMe data), and execution proceeds to step 306. Otherwise, at 314, the data is written to the region of the cache 140 that is allocated to NVMe data and execution proceeds to step 306. As such, when the data is read from persistent storage, it is only cached if it does not overlap with any data in the region of the cache 140 that is allocated to CXL data. Under circumstances different from those described above (as the context for FIGS. 3A and 3B) the methods may be different; for example, if the cache is full of CXL data, the writing to NVME cache, at 314, may be skipped.

In FIG. 3B, to perform the write operation, data is evicted, at 315, from the region of the cache 140 that is allocated to NVMe data; the new data is written, at 316, to the region of the cache 140 that is allocated to NVMe data; at 318, the persistent storage device 105 determines (e.g., by searching a list of addresses associated with the region of the cache 140 that is allocated to CXL data) whether the logical page address being written is in the set of addresses associated with 64-byte blocks in the region of the cache 140 that is allocated to CXL data. If it is, then at 320, the region of the cache 140 that is allocated to CXL data is updated (e.g., the affected CXL data (e.g., one or more 64-byte blocks of data) is invalidated, to avoid a situation in which data are stored both in the region of the cache 140 that is allocated to CXL data and in the region of the cache 140 that is allocated to NVMe data). Otherwise, this step (step 320) is skipped. The response (e.g., the command completion for the NVMe write command) is then sent, at 322. Under circumstances different from those described above (as the context for FIGS. 3A and 3B), the methods may be different; for example, if the cache is not full, the evicting, at 315, may be skipped. If the cache is full of CXL data, the NVME data may be written only to the persistent storage media 135 (and not cached).

Figure 3C:
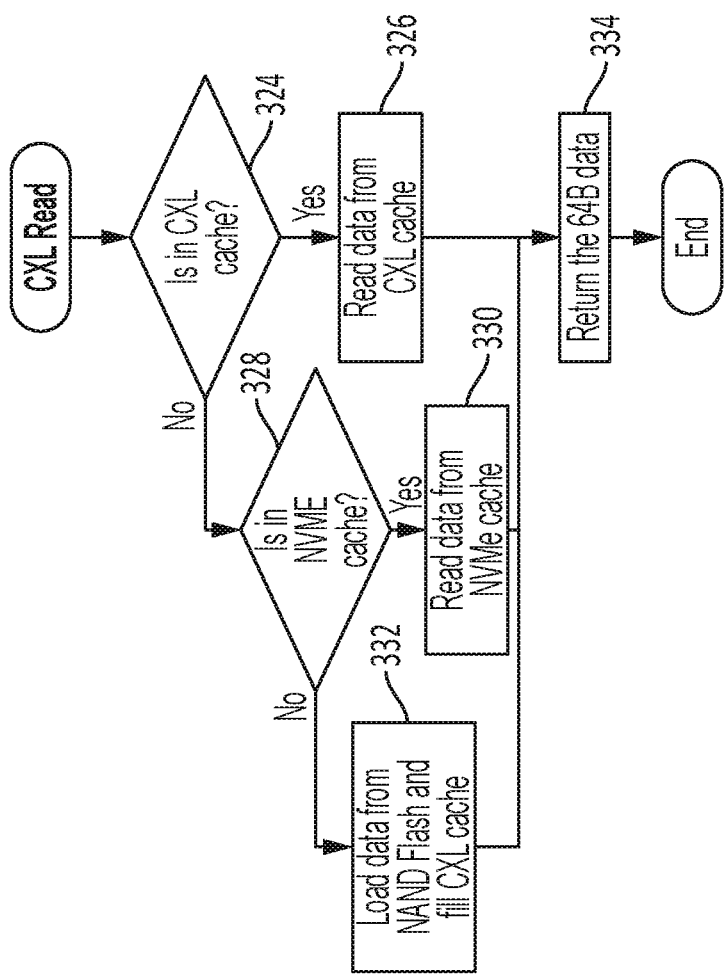
FIG. 3C is a flowchart of a second method for reading data, according to an embodiment of the present disclosure.
Figure 3D:
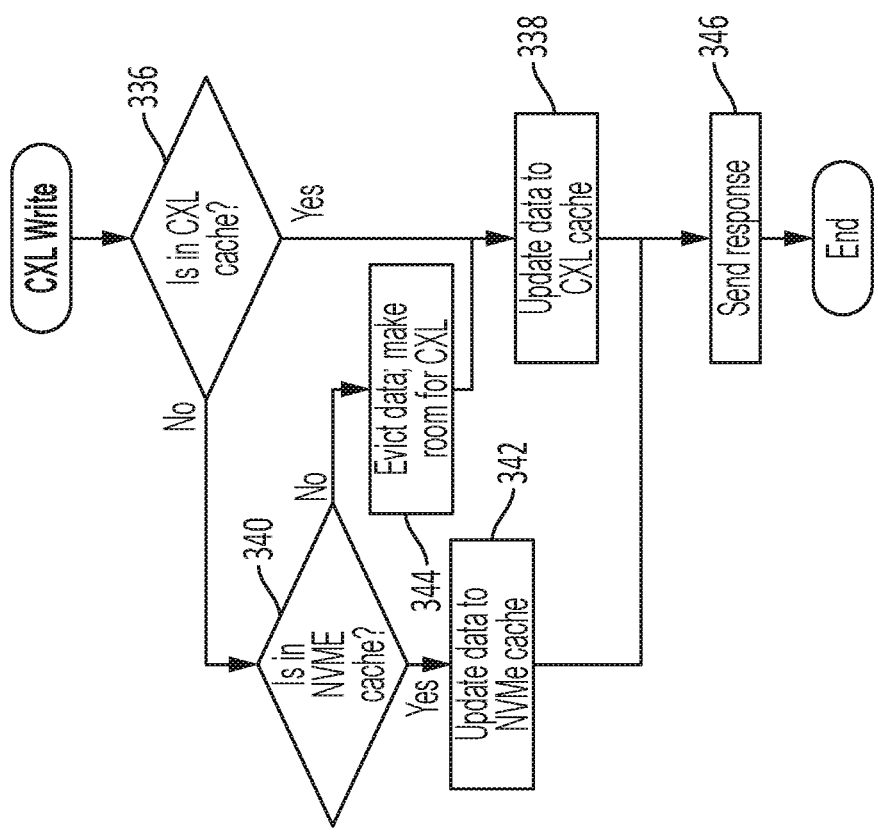
FIG. 3D is a flowchart of a second method for writing data, according to an embodiment of the present disclosure.

FIGS. 3C and 3D are flowcharts of a CXL read-modify-write operation (with FIG. 3C being a flowchart of a read operation and FIG. 3D being a flowchart of a write operation), in an example in which the cache hint is Cachable, and the cache 140 is full and has both data for NVMe and for CXL. In FIG. 3C, the persistent storage device 105 determines, at 324 (e.g., by searching a list of addresses associated with the region of the cache 140 that is allocated to CXL data), whether the data to be read is in the region of the cache 140 that is allocated to CXL data. If it is, then at 326, the data is read from the region of the cache 140 that is allocated to CXL data. If it is not, then, at 328, the persistent storage device 105 determines (e.g., by searching a list of addresses associated with the region of the cache 140 that is allocated to NVMe data) whether the data is in the region of the cache 140 that is allocated to NVMe data; if it is, then, at 330, the data is read from the region of the cache 140 that is allocated to NVMe data, and if it is not, the data is loaded, at 332, from the persistent storage media 135, and stored in the region of the cache 140 that is allocated to CXL data. At 334, the data (e.g., the 64-byte data block) is returned.

In FIG. 3D, the persistent storage device 105 determines, at 336 (e.g., by searching a list of addresses associated with the region of the cache 140 that is allocated to CXL data), whether the data to be read is in the region of the cache 140 that is allocated to CXL data. If it is, then at 338, the data is written to the region of the cache 140 that is allocated to CXL data. If it is not, then at 340, the persistent storage device 105 determines (e.g., by searching a list of addresses associated with the region of the cache 140 that is allocated to NVMe data) whether the data to be read is in the region of the cache 140 that is allocated to NVMe data. If it is, then at 342 the data are updated in the region of the cache 140 that is allocated to NVMe data; if it is not, then, at 344, a 64-byte data block is evicted from the region of the cache 140 that is allocated to CXL data and execution continues to step 338. A response (e.g., the command completion for the CXL write command) is then sent, at 346.

Figure 4:
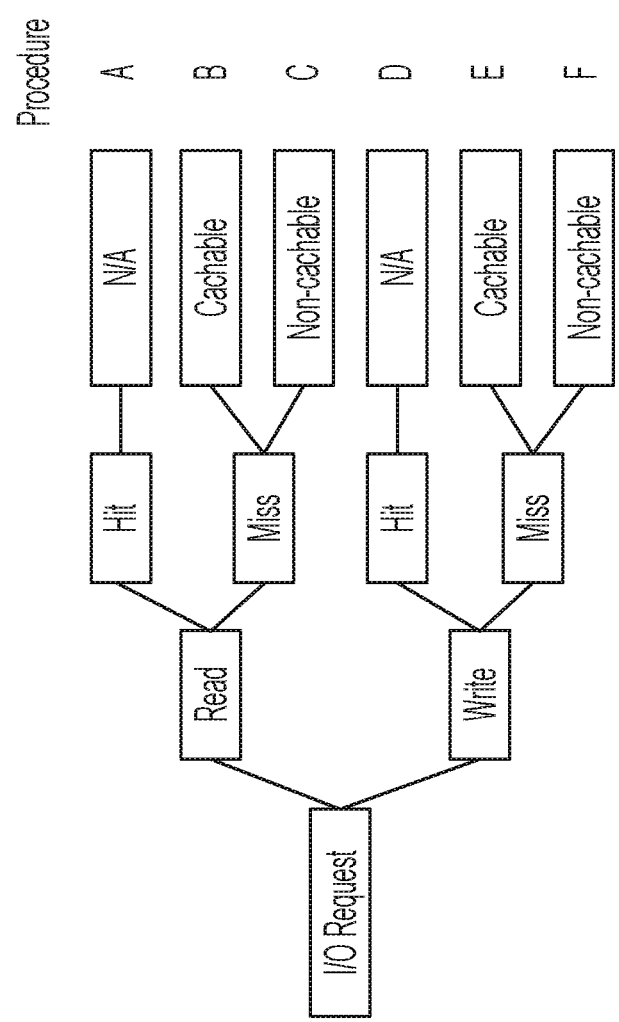
FIG. 4 is a decision tree, according to an embodiment of the present disclosure.

FIG. 4 shows a decision tree for selecting a procedure for executing a CXL read or write request (as part of a read-modify-write instruction), depending on whether the request is a read request or a write request, whether a cache hit or miss occurs, and whether the cache hint is Cachable or Non-cachable. In FIG. 4, "N/A" means that the selection of the procedure is unaffected by the cache hint. The column labeled "Procedure" identifies the procedure to be followed, with A referring to FIG. 5A, B referring to FIG. 5B, C referring to FIG. 5C, D referring to FIG. 5D, E referring to FIGS. 5E, and F referring to FIG. 5F.

Figure 5A:
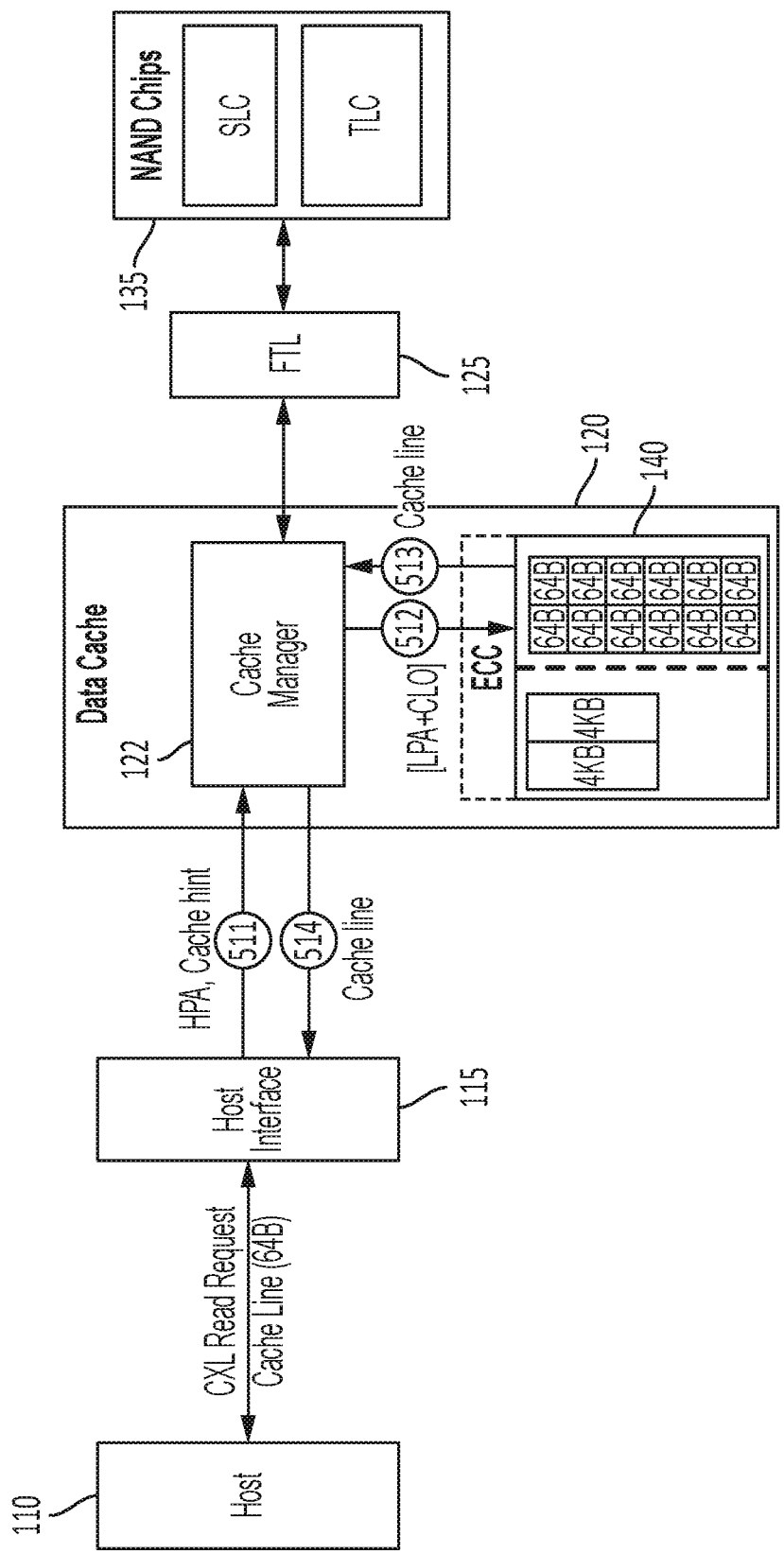
FIG. 5A is a hybrid block diagram and flowchart illustrating a first procedure performed by a persistent storage device, according to an embodiment of the present disclosure.
Figure 5B:
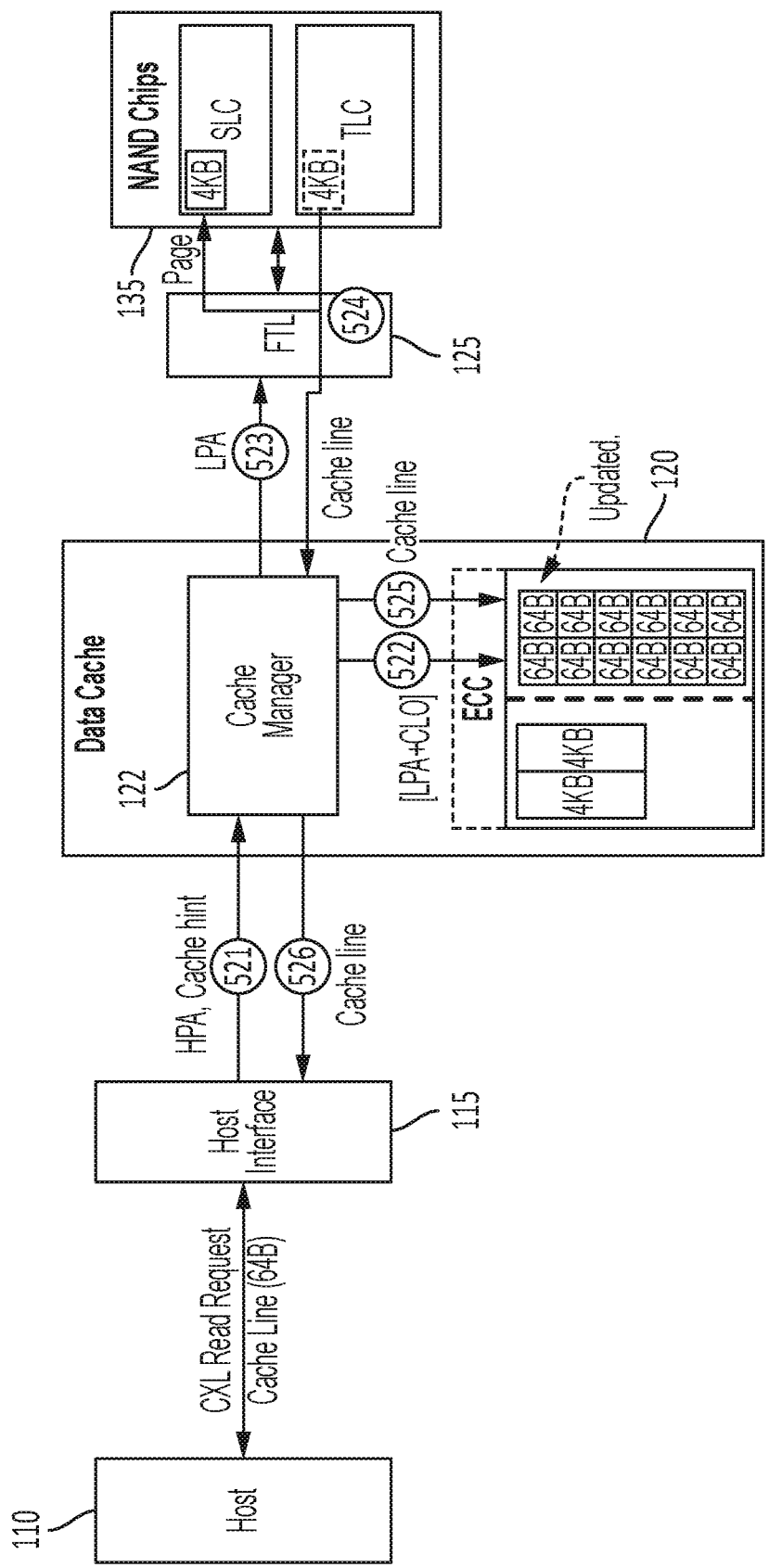
FIG. 5B is a hybrid block diagram and flowchart illustrating a second procedure performed by a persistent storage device, according to an embodiment of the present disclosure.
Figure 5C:
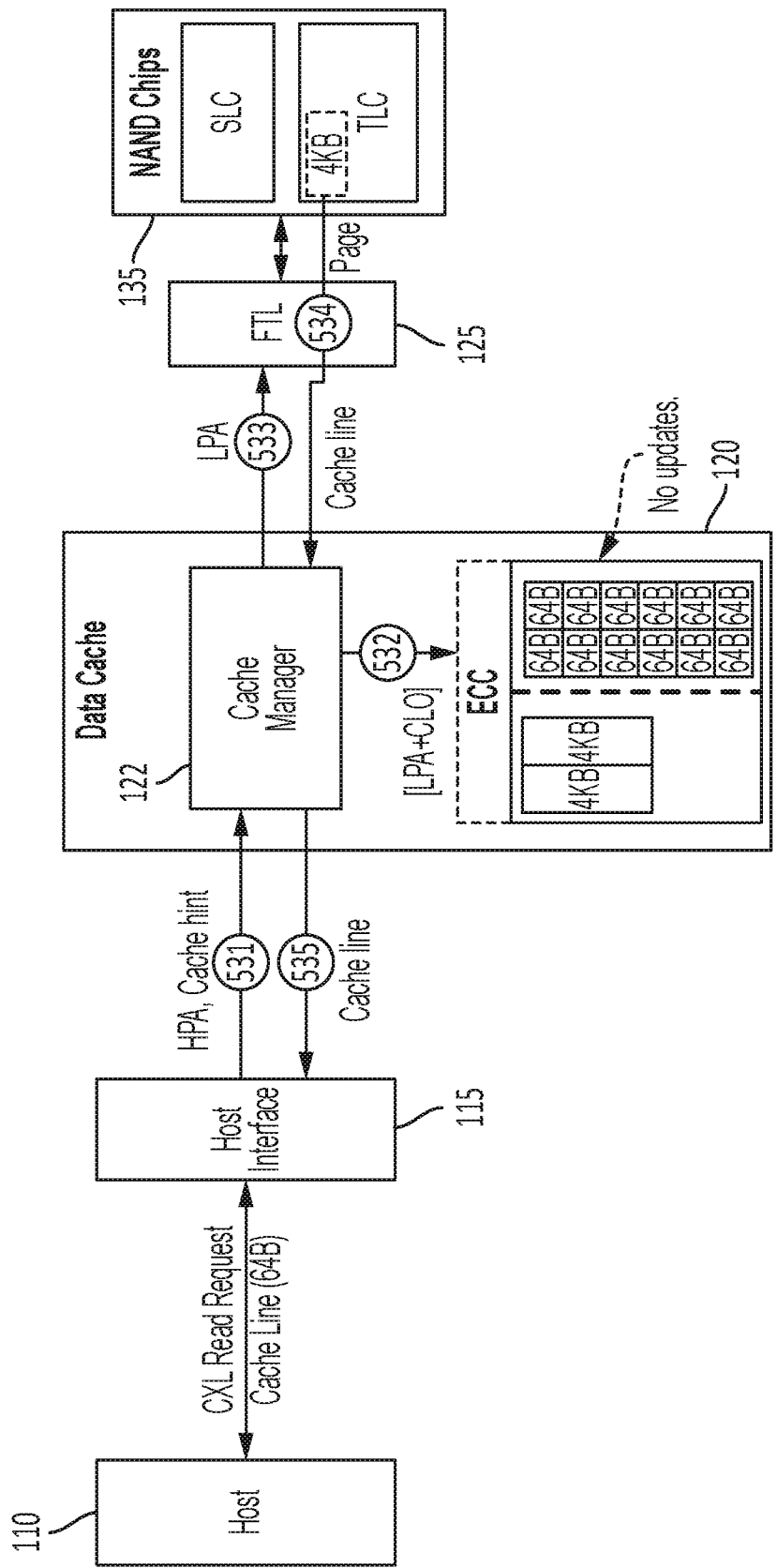
FIG. 5C is a hybrid block diagram and flowchart illustrating a third procedure performed by a persistent storage device, according to an embodiment of the present disclosure.

FIG. 5A is an example of a CXL read request with a cache hit. The persistent storage device 105 receives, at 511, a host physical address (HPA) and a cache hint, and determines that a cache hit has occurred. It calculates the address by concatenating the LPA and the CLO, sends the address, at 512, to the region of the cache 140 that is allocated to CXL data, receives the data (e.g., one cache line (64 bytes)) at 513, and sends the result (the cache line) to the host, at 514. FIG. 5B is an example of a CXL read request, with a cache hint set to Cachable, and a cache miss. The persistent storage device 105 receives, at 521, a host physical address (HPA) and the cache hint; at 522 it determines that a cache miss has occurred, at 523 it sends the read request to the flash translation layer 125, at 524, it determines that the data is in the triple-level cell media and moves the data to the single-level cell media, at 525 the data is cached in the region of the cache 140 that is allocated to CXL data, and at 526 the data is returned to the host. FIG. 5C is an example of a CXL read request, with a cache hint set to Non-cachable, and a cache miss. The persistent storage device 105 receives, at 531, a host physical address (HPA) and the cache hint; at 532 it determines that a cache miss has occurred, at 533 it sends the read request to the flash translation layer 125, at 534, the result is read from the triple-level cell media (a 4 kB data block may be read, and the data in this block may be discarded except for the 64-byte data block requested by the host), and at 535, the result is returned to the host.

Figure 5D:
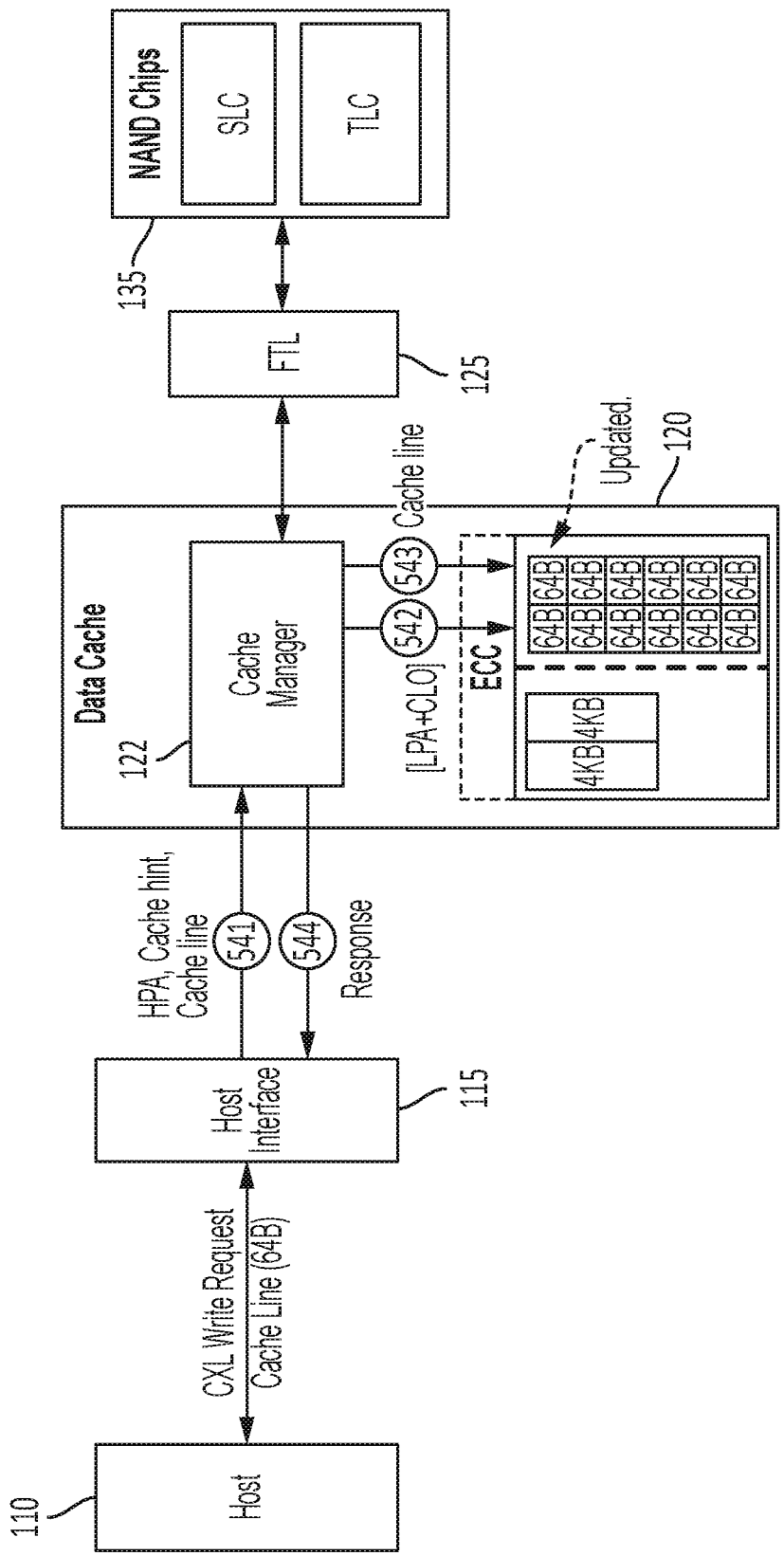
FIG. 5D is a hybrid block diagram and flowchart illustrating a fourth procedure performed by a persistent storage device, according to an embodiment of the present disclosure.
Figure 5E:
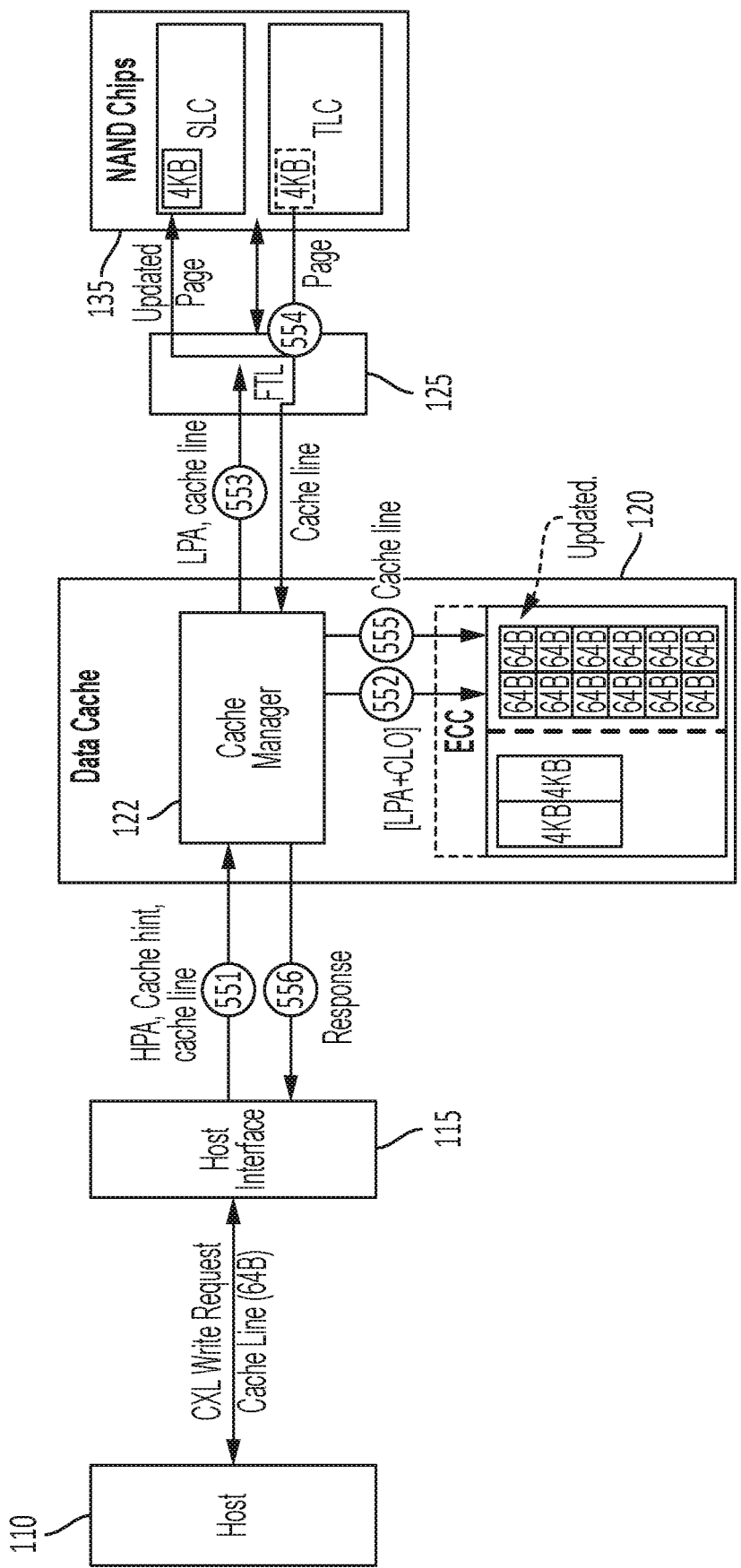
FIG. 5E is a hybrid block diagram and flowchart illustrating a fifth procedure performed by a persistent storage device, according to an embodiment of the present disclosure.
Figure 5F:
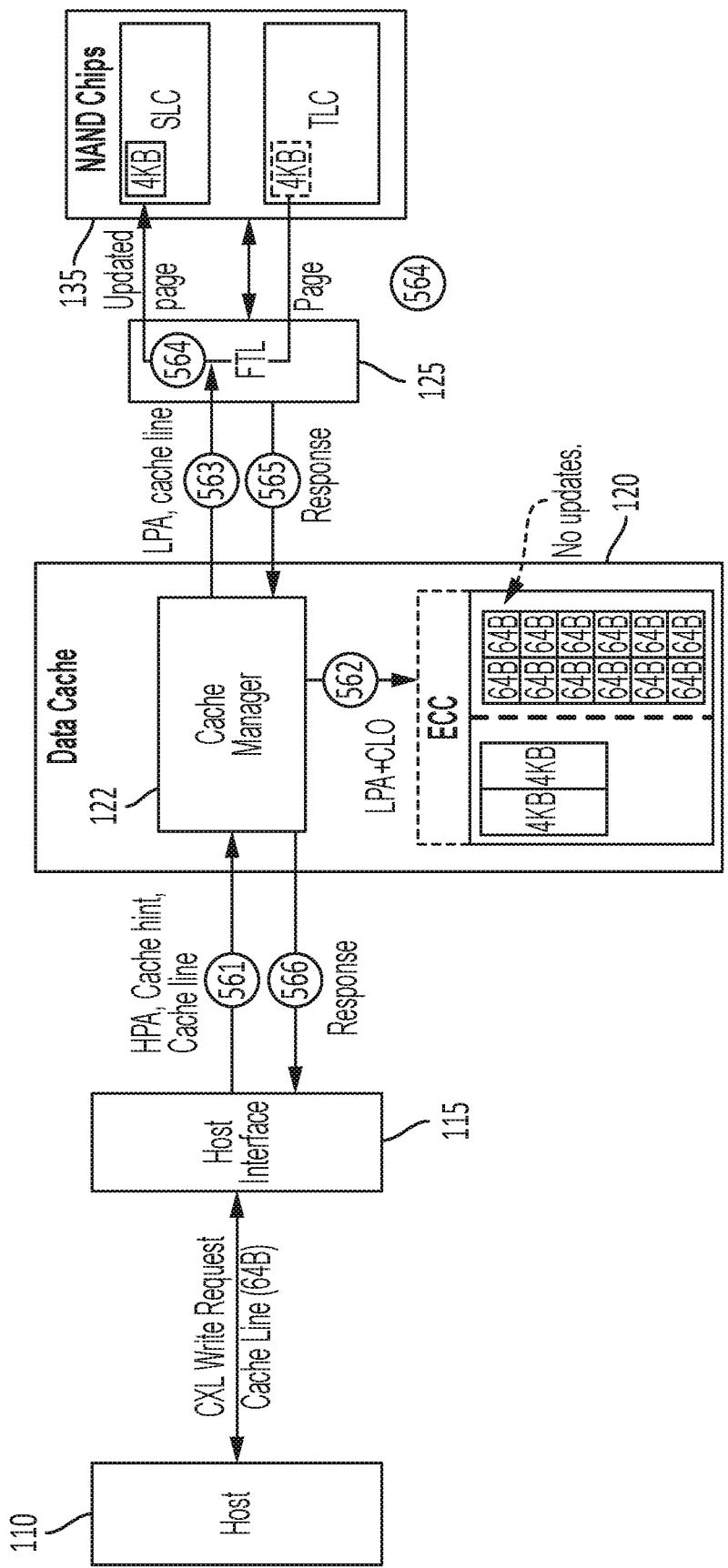
FIG. 5F is a hybrid block diagram and flowchart illustrating a sixth procedure performed by a persistent storage device, according to an embodiment of the present disclosure.

FIG. 5D is an example of a CXL write request with a cache hit. The persistent storage device 105 receives, at 541, a host physical address (HPA) a cache hint, and a cache line (e.g., a 64-byte block of data to be written) and determines that a cache hit has occurred. It sends the address, at 542, to the region of the cache 140 that is allocated to CXL data, determines that a cache hit has occurred, writes the data at 543, and sends a response to the host, at 544. FIG. 5E is an example of a CXL write request, with a cache hint set to Cachable, and a cache miss. The persistent storage device 105 receives, at 551, a host physical address (HPA) a cache hint, and a cache line (e.g., a 64-byte block of data to be written); at 552 it determines that a cache miss has occurred; at 553 it sends the write request to the flash translation layer 125; at 554, it determines that the data is in the triple-level cell media and saves the updated data to the single-level cell media (invalidating the old data in the triple-level cell, and combining the cache line and the page read from triple-level cell media), at 555 the data is cached in the region of the cache 140 that is allocated to CXL data, and at 556 a response is sent to the host. FIG. 5F is an example of a CXL write request, with a cache hint set to Non-cachable, and a cache miss. The persistent storage device 105 receives, at 561, a host physical address (HPA), a cache hint, and a cache line (e.g., a 64-byte block of data to be written); at 562 it determines that a cache miss has occurred, at 563 it sends the write request to the flash translation layer 125; at 564, it determines that the data is in the triple-level cell media and saves the updated data to the single-level cell media (invalidating the old data in the triple-level cell); at 565 a response is sent to the cache manager 122; and at 566 the response is forwarded to the host.

The procedures of FIGS. 5A-5D are unaffected by whether log-structured mode is employed. In FIGS. 5E and 5F, if log-structured mode is employed, the fourth step (e.g., 514) is not performed and the 64-byte data block is written directly to the single-level cell media. In each of FIGS. 5A-5F, the NVMe data path for an analogous operation may be similar.

In some embodiments, instead of handling exactly two different data payload sizes (e.g., 4 kB and 64 bytes), the persistent storage device 105 may handle requests with a payload size larger than a first threshold differently from requests with a payload size smaller than the first threshold.

Figure 6:
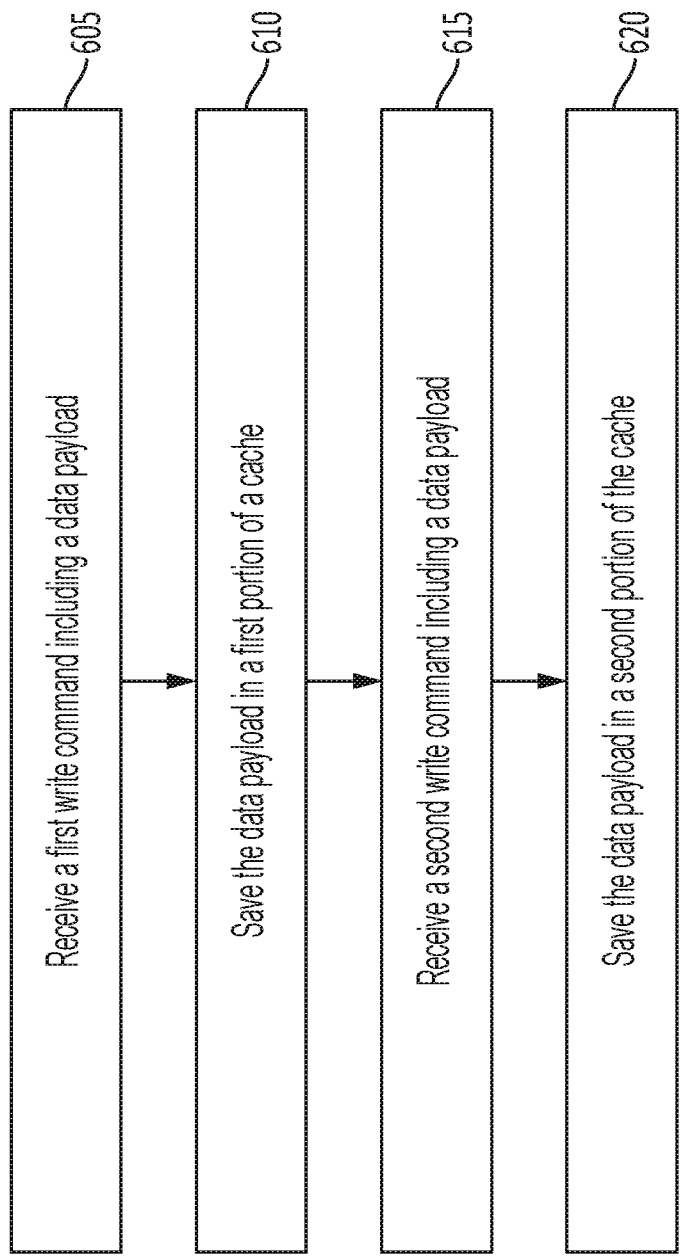
FIG. 6 is a flowchart of a method, according to an embodiment of the present disclosure.

FIG. 6 is a flowchart of a method, in some embodiments. The method includes receiving, at 605, a first write request comprising a data payload larger than a first threshold (e.g., an NVMe write request); saving, at 610, the data payload of the first write request in a first portion of a cache, the first portion being for data units having a size greater than the first threshold; receiving, at 615, a second write request comprising a data payload smaller than the first threshold (e.g., a CXL write request); and saving, at 620, the data payload of the second write request in a second portion of the cache, the second portion being for data units having a size smaller than the first threshold.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1-35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments may include features of the following numbered statements.

1. A persistent storage device, comprising:
a processing circuit;
a cache; and
persistent storage,
the processing circuit being configured to perform a method, the method comprising:
receiving a first write request according to a first protocol;
saving a data payload of the first write request in a first portion of the cache;
receiving a second write request according to a second protocol; and
saving a data payload of the second write request in a second portion of the cache.

2. The persistent storage device of statement 1, wherein the first write request comprises a cache hint instructing the persistent storage device to employ caching.

3. The persistent storage device of statement 1 or statement 2, wherein:
the first protocol addresses units of data at a first granularity;
the second protocol addresses units of data at a second granularity different from the first granularity; and
the method further comprises:
receiving a third write request, the third write request comprising a data payload and a cache hint, the cache hint instructing the persistent storage device to forego caching; and
saving the data payload of the third write request in the persistent storage.

4. The persistent storage device of statement 3, wherein:
the persistent storage comprises first storage media and second storage media, the first storage media having higher read latency than the second storage media;
the data payload of the third write request is smaller than a first threshold; and
the saving of the data payload of the third write request in the persistent storage comprises saving the data payload of the third write request in the second storage media.

5. The persistent storage device of statement 4, wherein:
the first storage media comprises a triple-level cell; and
the second storage media comprises a single-level cell.

6. The persistent storage device of statement 4, wherein the method further comprises:
receiving a fourth write request, the fourth write request comprising a data payload and a cache hint, the cache hint instructing the persistent storage device to forego caching; and
saving the data payload of the fourth write request in the persistent storage,
wherein:
the data payload of the fourth write request is larger than the first threshold; and
the saving of the data payload of the fourth write request in the persistent storage comprises saving the data payload of the fourth write request in the first storage media.

7. The persistent storage device of statement 6, wherein the method further comprises:
receiving a fifth write request, the fifth write request comprising:
a data payload larger than the first threshold; and
a cache hint, the cache hint instructing the persistent storage device to employ caching;
determining that the first portion of the cache is full;
evicting data from the first portion of the cache; and
saving the data payload of the fifth write request in the first portion of the cache.

8. The persistent storage device of statement 6 or statement 7, wherein the method further comprises:
receiving a fifth write request, the fifth write request comprising:
a data payload smaller than the first threshold; and
a cache hint, the cache hint instructing the persistent storage device to employ caching;
determining that the second portion of the cache is full and that space is available in the first portion of the cache;
reducing the size of the first portion of the cache;
increasing the size of the second portion of the cache; and
saving the data payload of the fifth write request in the second portion of the cache.

9. The persistent storage device of statement 8, wherein the method further comprises:
receiving a sixth write request, the sixth write request comprising:
a data payload smaller than the first threshold; and
a cache hint, the cache hint instructing the persistent storage device to employ caching;
determining that the first portion of the cache is full and that the second portion of the cache is full;
evicting data from the first portion of the cache;
reducing the size of the first portion of the cache;
increasing the size of the second portion of the cache; and
saving the data payload of the sixth write request in the second portion of the cache.

10. The persistent storage device of statement 8 or statement 9, wherein the method further comprises:
receiving a sixth write request, the sixth write request comprising:
a data payload smaller than the first threshold; and
a cache hint, the cache hint instructing the persistent storage device to employ caching;
determining that the first portion of the cache has a size of zero and that the second portion of the cache is full;
evicting data from the second portion of the cache; and
saving the data payload of the sixth write request in the second portion of the cache.

11. The persistent storage device of any one of the preceding statements, wherein the first write request is a Nonvolatile Memory Express (NVMe) write request, and the second write request is a Compute Express Link (CXL) write request.

12. A method, comprising:
receiving, by a persistent storage device, a first write request according to a first protocol;
saving a data payload of the first write request in a first portion of a cache;
receiving a second write request according to a second protocol; and
saving a data payload of the second write request in a second portion of the cache.

13. The method of statement 12, wherein the first write request comprises a cache hint instructing the persistent storage device to employ caching.

14. The method of statement 12 or statement 13, wherein:
the first protocol addresses units of data at a first granularity;
the second protocol addresses units of data at a second granularity different from the first granularity; and the method further comprises:
receiving a third write request, the third write request comprising a data payload and a cache hint, the cache hint instructing the persistent storage device to forego caching; and
saving the data payload of the third write request in persistent storage of the persistent storage device.

15. The method of statement 14, wherein:
the persistent storage comprises first storage media and second storage media, the first storage media having higher read latency than the second storage media;
the data payload of the third write request is smaller than a first threshold; and
the saving of the data payload of the third write request in the persistent storage comprises saving the data payload of the third write request in the second storage media.

16. The method of statement 15, wherein:
the first storage media comprises a triple-level cell; and
the second storage media comprises a single-level cell.

17. The method of statement 15 or statement 16, further comprising:
receiving a fourth write request, the fourth write request comprising a data payload and a cache hint, the cache hint instructing the persistent storage device to forego caching; and
saving the data payload of the fourth write request in the persistent storage,
wherein:
the data payload of the fourth write request is larger than the first threshold; and
the saving of the data payload of the fourth write request in the persistent storage comprises saving the data payload of the fourth write request in the first storage media.

18. The method of statement 17, further comprising:
receiving a fifth write request, the fifth write request comprising:
a data payload larger than the first threshold; and
a cache hint, the cache hint instructing the persistent storage device to employ caching;
determining that the first portion of the cache is full;
evicting data from the first portion of the cache; and
saving the data payload of the fifth write request in the first portion of the cache.

19. The method of statement 17 or statement 18, further comprising:
receiving a fifth write request, the fifth write request comprising:
a data payload smaller than the first threshold; and
a cache hint, the cache hint instructing the persistent storage device to employ caching;
determining that the second portion of the cache is full and that space is available in the first portion of the cache;
reducing the size of the first portion of the cache;
increasing the size of the second portion of the cache; and
saving the data payload of the fifth write request in the second portion of the cache.

20. A persistent storage device, comprising:
means for processing;
a cache; and
persistent storage,
the means for processing being configured to perform a method, the method comprising:
receiving a first write request comprising a data payload larger than a first threshold;
saving the data payload of the first write request in a first portion of the cache, the first portion being for data units having a size greater than the first threshold;
receiving a second write request comprising a data payload smaller than the first threshold; and
saving the data payload of the second write request in a second portion of the cache, the second portion being for data units having a size smaller than the first threshold.

Although exemplary embodiments of a system and method for persistent storage have been specifically described and illustrated herein, many modifications and variations will be apparent to those skilled in the art. Accordingly, it is to be understood that a system and method for persistent storage constructed according to principles of this disclosure may be embodied other than as specifically described herein. The invention is also defined in the following claims, and equivalents thereof.

What is claimed is:
1. A persistent storage device, comprising:
a processing circuit;
a cache; and
persistent storage,
the processing circuit being configured to perform a method, the method comprising:
receiving a first write request according to a first protocol, wherein the first write request comprises a cache hint corresponding to the first protocol;
based on the cache hint, saving a data payload of the first write request in a first portion of the cache corresponding to the first protocol;
receiving a second write request according to a second protocol; and
saving a data payload of the second write request in a second portion of the cache.

2. The persistent storage device of claim 1, wherein the cache hint is configured to instruct the persistent storage device to employ caching.

3. The persistent storage device of claim 1, wherein:
the first protocol addresses units of data at a first granularity;
the second protocol addresses units of data at a second granularity different from the first granularity; and
the method further comprises:
receiving a third write request, the third write request comprising a data payload and a cache hint, the cache hint instructing the persistent storage device to forego caching; and
saving the data payload of the third write request in the persistent storage.

4. The persistent storage device of claim 3, wherein:
the persistent storage comprises first storage media and second storage media, the first storage media having higher read latency than the second storage media;
the data payload of the third write request is smaller than a first threshold; and
the saving of the data payload of the third write request in the persistent storage comprises saving the data payload of the third write request in the second storage media.

5. The persistent storage device of claim 4, wherein:
the first storage media comprises a triple-level cell; and
the second storage media comprises a single-level cell.

6. The persistent storage device of claim 4, wherein the method further comprises:
  receiving a fourth write request, the fourth write request comprising a data payload and a cache hint, the cache hint instructing the persistent storage device to forego caching; and
  saving the data payload of the fourth write request in the persistent storage,
  wherein:
    the data payload of the fourth write request is larger than the first threshold; and
    the saving of the data payload of the fourth write request in the persistent storage comprises saving the data payload of the fourth write request in the first storage media.

7. The persistent storage device of claim 6, wherein the method further comprises:
  receiving a fifth write request, the fifth write request comprising:
    a data payload larger than the first threshold; and
    a cache hint, the cache hint instructing the persistent storage device to employ caching;
  determining that the first portion of the cache is full;
  evicting data from the first portion of the cache; and
  saving the data payload of the fifth write request in the first portion of the cache.

8. The persistent storage device of claim 6, wherein the method further comprises:
  receiving a fifth write request, the fifth write request comprising:
    a data payload smaller than the first threshold; and
    a cache hint, the cache hint instructing the persistent storage device to employ caching;
  determining that the second portion of the cache is full and that space is available in the first portion of the cache;
  reducing a size of the first portion of the cache;
  increasing a size of the second portion of the cache; and
  saving the data payload of the fifth write request in the second portion of the cache.

9. The persistent storage device of claim 8, wherein the method further comprises:
  receiving a sixth write request, the sixth write request comprising:
    a data payload smaller than the first threshold; and
    a cache hint, the cache hint instructing the persistent storage device to employ caching;
  determining that the first portion of the cache is full and that the second portion of the cache is full;
  evicting data from the first portion of the cache;
  reducing the size of the first portion of the cache;
  increasing the size of the second portion of the cache; and
  saving the data payload of the sixth write request in the second portion of the cache.

10. The persistent storage device of claim 8, wherein the method further comprises:
  receiving a sixth write request, the sixth write request comprising:
    a data payload smaller than the first threshold; and
    a cache hint, the cache hint instructing the persistent storage device to employ caching;
  determining that the first portion of the cache has a size of zero and that the second portion of the cache is full;
  evicting data from the second portion of the cache; and
  saving the data payload of the sixth write request in the second portion of the cache.

11. The persistent storage device of claim 1, wherein the first write request is a Nonvolatile Memory Express (NVMe) write request, and the second write request is a Compute Express Link (CXL) write request.

12. A method, comprising:
  receiving, by a persistent storage device, a first write request according to a first protocol, wherein the first write request comprises a cache hint corresponding to the first protocol;
  based on the cache hint, saving a data payload of the first write request in a first portion of a cache corresponding to the first protocol;
  receiving a second write request according to a second protocol; and
  saving a data payload of the second write request in a second portion of the cache.

13. The method of claim 12, wherein the cache hint is configured to instruct the persistent storage device to employ caching.

14. The method of claim 12, wherein:
  the first protocol addresses units of data at a first granularity;
  the second protocol addresses units of data at a second granularity different from the first granularity; and
  the method further comprises:
    receiving a third write request, the third write request comprising a data payload and a cache hint, the cache hint instructing the persistent storage device to forego caching; and
    saving the data payload of the third write request in persistent storage of the persistent storage device.

15. The method of claim 14, wherein:
  the persistent storage comprises first storage media and second storage media, the first storage media having higher read latency than the second storage media;
  the data payload of the third write request is smaller than a first threshold; and
  the saving of the data payload of the third write request in the persistent storage comprises saving the data payload of the third write request in the second storage media.

16. The method of claim 15, wherein:
  the first storage media comprises a triple-level cell; and
  the second storage media comprises a single-level cell.

17. The method of claim 15, further comprising:
  receiving a fourth write request, the fourth write request comprising a data payload and a cache hint, the cache hint instructing the persistent storage device to forego caching; and
  saving the data payload of the fourth write request in the persistent storage,
  wherein:
    the data payload of the fourth write request is larger than the first threshold; and
    the saving of the data payload of the fourth write request in the persistent storage comprises saving the data payload of the fourth write request in the first storage media.

18. The method of claim 17, further comprising:
receiving a fifth write request, the fifth write request comprising:
- a data payload larger than the first threshold; and
- a cache hint, the cache hint instructing the persistent storage device to employ caching;

determining that the first portion of the cache is full;
evicting data from the first portion of the cache; and
saving the data payload of the fifth write request in the first portion of the cache.

19. The method of claim 17, further comprising:
receiving a fifth write request, the fifth write request comprising:
- a data payload smaller than the first threshold; and
- a cache hint, the cache hint instructing the persistent storage device to employ caching;

determining that the second portion of the cache is full and that space is available in the first portion of the cache;
reducing the size of the first portion of the cache;
increasing the size of the second portion of the cache; and
saving the data payload of the fifth write request in the second portion of the cache.

20. A persistent storage device, comprising:
a processor;
a cache; and
persistent storage,
the processor being configured to perform a method, the method comprising:
- receiving a first write request comprising a data payload larger than a first threshold, wherein the first write request comprises a cache hint corresponding to a first protocol;
- based on the cache hint, saving the data payload of the first write request in a first portion of the cache corresponding to the first protocol, the first portion being for data units having a size greater than the first threshold;
- receiving a second write request comprising a data payload smaller than the first threshold; and
- saving the data payload of the second write request in a second portion of the cache, the second portion being for data units having a size smaller than the first threshold.

* * * * *